June 9, 1964 H. ROCKMANN 3,136,408

CARRYING ARRANGEMENT FOR RECORDING APPARATUS

Filed Sept. 5, 1961

INVENTOR:
HERBERT ROCKMANN by:
Michael S. Striker
Attorney

United States Patent Office 3,136,408

Patented June 9, 1964

3,136,408
CARRYING ARRANGEMENT FOR RECORDING APPARATUS

Herbert Rockmann, Wilhelmshaven, Germany, assignor to Olympia Werke AG, Wilhelmshaven, Germany Filed Sept. 5, 1961, Ser. No. 135,891
Claims priority, application Germany Sept. 2, 1960
4 Claims. (Cl. 206—1)

Figure 2:
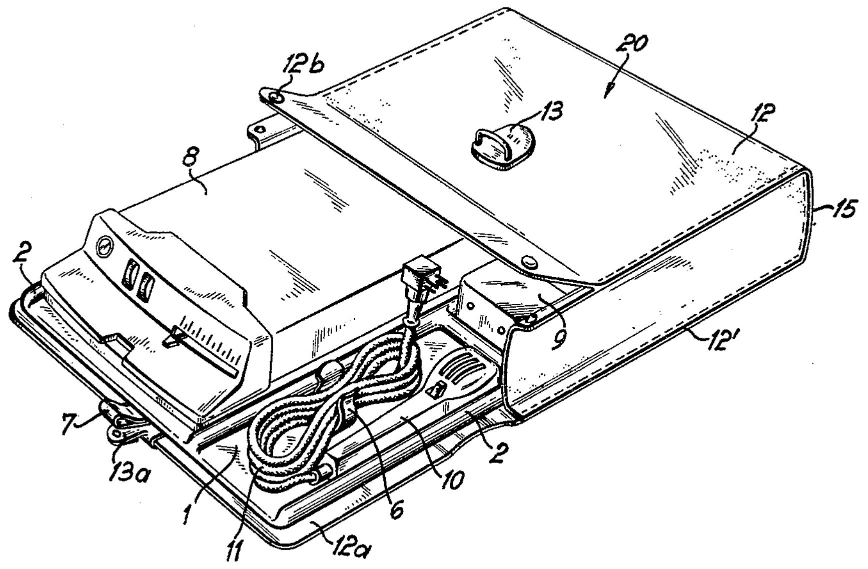

The present invention relates to a carrying arrangement for recording apparatus, and more particularly to a support plate for holding several parts of a recording apparatus so that the same can be handled as a unit when removed from, or inserted into a carrying case.

Portable dictating apparatus generally includes several parts, namely, the recorder, batteries or a charging device, a microphone, and a microphone cable, and occasionally an ear phone and its cable. These devices are usually carried in a carrying case which is provided with loops for securing each device in the case. Carrying cases consisting of hard plates and resembling a small suitcase are comparatively expensive, while leather cases have the disadvantage that it is comparatively difficult to remove the several devices from the case and to properly place the same again in the case.

It is one object of the present invention to overcome the disadvantages of known carrying arrangements for recording apparatus and to provide a carrying arrangement permitting a very fast removal from, and insertion into a carrying case, of all devices of which the recording apparatus consists.

Another object of the present invention is to mount all devices of a recording apparatus on a support plate which can be easily inserted into, or removed from the carrying case so that the recording apparatus is ready for use and properly positioned when removed from the carrying case.

Another object of the present invention is to provide a support plate permitting the removal of some devices from the carrying case while the support plates with other devices remains in the carrying case.

With these objects in view, the present invention relates to a support plate having means for holding a plurality of devices together constituting a recording apparatus so that the recording apparatus and the support plate can be handled as a unit.

In the preferred embodiment of the present invention, the support plate consists of a synthetic plastic material, and has ridges forming recesses for holding the devices of the recording apparatus. A handle, such as a flexible loop is secured to the support plate to facilitate the insertion of the unit into a carrying case, and the removal of the unit from the carrying case.

The carrying case has at least one straight flat wall which is in contact with the support plate when the unit is in the carrying case. When the recording apparatus is to be used, the carrying case is placed on a table resting on the above mentioned flat wall, and the support plate with the recording apparatus slides out of the opening of the carrying case along the straight wall when the handle is pulled. Preferably, the flat wall of the carrying case has an extension forming a flexible flap which can be bent to close the opening of the case, but which can also be placed in a straight position extending the straight wall so that the support plate can slide thereon.

Figure 1:
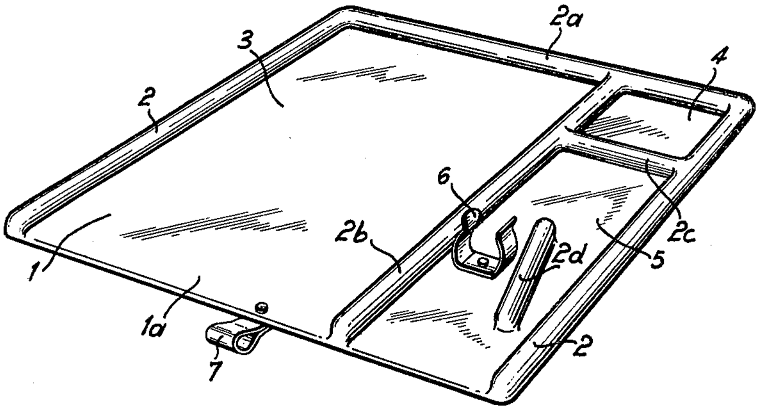

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a perspective view illustrating a support plate according to the present invention; and FIG. 2 is a perspective view illustrating a carrying arrangement according to the present invention.

Referring now to the drawings, and more particularly to FIG. 1, a rectangular support plate 1, preferably consisting of a synthetic plastic material, has ridges 2 along its lateral edges, a ridge **2*a* extending along its rear edge, a ridge 2*b* extending from ridge 2*a* to the front edge, a transverse ridge 2*c*, and an oblique ridge 2*d*. The ridges form recesses 3, 4, and 5. Since no ridge extends along the front edge of the support plate, recesses 3 and 5 are open toward the front edge. The outline of recess 1 corresponds to the outline of the base of a miniature recording device 8 so that the same can be placed in recess 3, as shown in FIG. 2. In this position, the recording apparatus cannot move laterally, or toward the rear of support plate 1, but can slide over the front edge 1*a*. A clamping spring 6 is secured to support plate 1 and is located in recess 5, so that the cable 11 of a microphone 10 may be held by clamping spring 6, while the microphone 10 abuts ridges 2 and 2*c*, and also ridge 2*d* if such a ridge is provided. In the embodiment of FIG. 2, ridge 2*d*** is omitted.

A battery or a charging device 9 is located in recess 4 which is closed on all sides by ridges. A handle in a form of a flexible loop 7 is secured to the front edge **1*a* of support plate 1. When the devices 8, 9, 10, 11 of the recording apparatus are held by the ridges of the support plate, the support plate 1 and the recording apparatus form a unit which can be easily inserted into the carrying case 20. Carrying case 20 is prismatic, and has a first pair of side walls 12 and 12′, and another pair of side walls 14, and a bottom wall 15. Side wall 12 is provided with a lock 13, and side wall 12′ has a flexible extension 12*a* which can be moved between the straight position illustrated in FIG. 2, and a bent position closing the opening of the carrying case with the catch 13*a* engaging lock 13. An edge portion of side wall 12 can also be turned up as shown in FIG. 2, and is attached to the side walls 14 by snaps 12*b***.

When the dictating apparatus is carried about, support plate 1 with the recording devices 8, 9, 10, 11 is completely inserted into the carrying case 20, with the rear edge **2*a* in contact with the bottom wall 15, and the front edge 1*a* extending to the opening of the carrying case so that the flap 12*a* can be bent over for closing the carrying case. As shown in FIG. 1, the distance between the top face of recording device 8 and wall 12 is less than the height of the ridges so that the recording device is held seated in recess 3. When the dictating apparatus is to be used, side wall 12′ is placed on a table, and flap 12*a* is straightened out and also placed on the table to be located in the same plane as side wall 12′ as shown in FIG. 2. The inner surface of wall 12′ and of flap 12*a* forms a continuous planar surface on which the underside of support plate 1 is slidable. Loop 7 is gripped by the operator, and the support plate is pulled out from the carrying case while sliding on the surface of wall 12′ and flap extension 12*a*. The dictating apparatus can be used in the position shown in FIG. 2, when the microphone is removed from recess 5, and the plug of cable 11 is inserted into a socket on the recorder 8. It is, of course, also possible to slide the entire unit, that is support plate 1 and the dictating apparatus, out of the carrying case, and to place the support plate somewhere else, for example on a desk. In any event, the unit is easily returned to the carrying case by simply sliding the support plate 1 along the planar surface formed by wall 12′ and extension 12*a*. Particularly, if the recording apparatus is used in the position of FIG. 2, the entire unit can be placed in the carrying case by a very fast operation requiring only the pushing back of the unit into the carrying case, and closing of the flexible flap 12***a*. The numerous operations required by the conventional carrying arrangement for placing the several devices of the dictating apparatus in a carrying case, are completely eliminated in the arrangement of the present invention.

If for some reason it is desired to remove only the recorder 8, or only the microphone 10 from the carrying case, it is only necessary to open flap 12*a* and to slide recorder 8 over the front edge 1*a* of the support plate which is possible since no ridge is provided along front edge 1. In the same manner, the microphone 10 can be removed from the carrying case 20, while the support plate and the batteries 9 remain in a carrying case.

It will be understood that each of the elements described above or two or more together, may also find a useful application in other types of carrying arrangements for a plurality of devices differing from the types described above.

While the invention has been illustrated and described as embodied in a carrying arrangement for dictating apparatus including a carrying case and a support plate for the dictating apparatus, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed and desired to be secured by Letters Patent is:

1. In combination with a carrying case having side walls, a bottom wall, an opening opposite said bottom wall bounded by said side walls, and a closure flap for closing said opening; a support plate located in said case and having lateral edges extending along one pair of side walls, respectively, a rear edge extending along said bottom wall, and a front edge extending along said opening, said support plate having a top face with projecting ridges forming three sides of at least one recess open on said front edge; a plurality of devices, at least one of said devices being seated in said open recess so that said one device is non-slidable relative to said support plate except toward said front edge, said support plate having a bottom face slidable on one wall of the other pair of walls so that said support plate and said one device can be together inserted and removed through said opening, and so that said one device can be removed from said carrying case by sliding said device through said opening across said front edge of said support plate.

2. A supporting arrangement comprising a rectangular support plate having two lateral ridges extending along the lateral edges thereof, a third ridge extending along the rear edge thereof, a fourth ridge extending from said rear edge parallel to said lateral ridges to said front edge so as to form an open recess bounded on three sides by ridges and opened on said front edge, and a fifth ridge parallel to said third ridge and forming with the same, with said fourth ridge and with one of said lateral ridges a closed recess; a recording device matching said open recess and seated in the same so as to be non-movable in three directions, but free to slide on said support plate over said front edge out of said recess; accessories for said recording device mounted on the remaining portion of said support plate and including an accessory seated in said closed recess for movement with said support plate; and a case enveloping said support plate and having an opening in the region of said front edge and including a closure flap having a position for closing said opening to retain said support plate and said recording device in said case.

3. A carrying arrangement comprising, in combination, a support plate having a top face with two parallel ridges and one transverse ridge forming a rectangular recess having an open end; a recording device having a height greater than the height of said ridges seated in said recess and having two longitudinal edges and a transverse edge in contact with said ridges and being slidable along said longitudinal ridges and along said top face out of said open end of said recess; a carrying case enveloping said support plate and said recording device and having a first wall slidably engaged by the bottom face of said support plate, and a second wall parallel with said first wall and spaced from said recording device a distance smaller than the height of said ridges whereby said first and second walls retain said recording device seated in said recess, said walls bounding an opening in the region of said open end of said recess so that said recording device sliding on said support plate through said open end of said recess and through said opening can be removed from said case without said support plate, and so that said support plate can be moved out of said opening while sliding on said first wall with said device due to the engagement between said transverse ridge of said support plate with said transverse edge of said device; and a closure means for closing said opening in said case.

4. A carrying arrangement for a recording device, comprising, in combination, a support plate having a top face with two parallel ridges and one transverse ridge forming a rectangular recess having an open end; a recording device having a height greater than the height of said ridges seated in said recess and having two longitudinal edges and a transverse edge in contact with said ridges and being slidable along said longitudinal ridges and along said top face out of said open end of said recess; and a carrying case enveloping said support plate and said recording device and having a first wall slidably engaged by the bottom face of said support plate, and a second wall parallel with said first wall and spaced from said recording device a distance smaller than the height of said ridges and whereby said first and second walls retain said recording device seated in said recess, said walls bounding an opening in the region of said open end of said recess, said first wall having a flexible closure flap movable between a bent position closing said opening and a straight position located in the plane of said first wall so that said recording device sliding on said support plate through said open end of said recess and through said opening can be removed from said case without said support plate, and so that said support plate can be moved out of said opening while sliding on said first wall and on said extension with said recording device due to the engagement between said transverse ridge of said support plate with said transverse edge of said recording device.

References Cited in the file of this patent

UNITED STATES PATENTS

| | | |
|---|---|---|
| 305,544 | Stirrup | Sept. 23, 1884 |
| 339,420 | Hubbard et al. | Apr. 6, 1886 |
| 1,762,635 | Lambert | Jan. 10, 1930 |
| 2,304,758 | Botham | Dec. 8, 1942 |
| 2,410,923 | Beardsley | Nov. 12, 1946 |
| 2,625,242 | Reed | Jan. 13, 1953 |
| 2,652,702 | Hintze | Sept. 22, 1953 |
| 2,711,819 | Vander Lugt | June 28, 1955 |
| 2,764,005 | Harris | Sept. 25, 1956 |
| 2,918,342 | Tarte | Dec. 22, 1959 |